United States Patent
Noonan

[11] Patent Number: 5,431,478
[45] Date of Patent: Jul. 11, 1995

[54] CONVERTIBLE BABY CARRIER

[76] Inventor: Mark Noonan, 529 W. 42nd St., Apt. 9X, New York, N.Y. 10036

[21] Appl. No.: 34,292

[22] Filed: Mar. 22, 1993

[51] Int. Cl.6 ............................................. A47C 13/00
[52] U.S. Cl. .................................. 297/130; 297/183.4; 297/256.16
[58] Field of Search ................... 297/118, 130, 29, 34, 297/51, 52, 16.1, 250.1, 256.15, 217, DIG. 2, 183/354.12, 354.13, 376; 280/647, 648, 650, 642, 643, 47.38

[56] References Cited

U.S. PATENT DOCUMENTS

| | | | |
|---|---|---|---|
| 2,450,783 | 10/1948 | Collins | 297/51 X |
| 2,720,911 | 10/1955 | Lantz | 297/130 X |
| 3,115,364 | 12/1963 | Berlin | 297/130 |
| 3,679,223 | 7/1972 | Sakal | 280/642 X |
| 3,740,791 | 6/1973 | Bulin | 297/376 X |
| 3,984,115 | 10/1976 | Miller | 280/30 |
| 4,157,837 | 6/1979 | Kao | 280/30 |
| 4,274,674 | 6/1981 | Deloustal | 297/376 X |
| 4,487,428 | 12/1984 | Harada et al. | 280/648 |
| 4,586,721 | 5/1986 | Harada et al. | 280/30 |
| 4,641,844 | 2/1987 | Mar et al. | 280/30 |
| 4,747,526 | 5/1988 | Launes | 224/155 |
| 4,786,064 | 11/1988 | Baghdasarian | 297/130 X |
| 4,872,692 | 10/1989 | Steenburg | 280/648 X |
| 4,989,888 | 2/1991 | Qureshi et al. | 280/648 X |
| 5,230,523 | 7/1993 | Wilhelm | 297/250.1 X |

FOREIGN PATENT DOCUMENTS 2136685 9/1984 United Kingdom ............ 297/250.1

Primary Examiner—Kenneth J. Dorner
Assistant Examiner—Milton Nelson, Jr.
Attorney, Agent, or Firm—Hopkins & Thomas

[57] ABSTRACT

A convertible baby carrier having a clamshell figuration in which a first body portion and a second body portion are pivotally attached to each other, and includes apparatus for adjusting and fixing the angular relationship of the two body portions. The carrier includes detachable legs that are pivotally mounted to the body portions, and the apparatus is provided for fixing the angular positions of the legs relative to the body portions. The carrier can be converted to a seat, a stroller, a bed, a backpack, or the like by altering the angular relationships of the body portions and of the legs relative to the body portions.

29 Claims, 5 Drawing Sheets

CONVERTIBLE BABY CARRIER

FIELD OF INVENTION

This invention relates to a baby carrier, and, more particularly, to a baby carrier which is convertible to any one of a number of configurations for a variety of uses.

BACKGROUND OF THE INVENTION

In general, a baby carrier comprises a cloth bucket having leg holes therein and in which the infant sits with its legs protruding from the holes. The bucket is supported by a framework of metal tubing, and, for mobility, wheels may be provided at the bottom of the legs of the framework. Usually, the framework is made to be collapsible so that the carrier may be folded up and stored when not in use, or so that it may be easily transported from place to place.

Such a carrier as just described has limited utility, and the prior art is replete with convertible baby carriers which are intended to have a plurality of uses. In U.S. Pat. No. 4,747,526 of Launes, there is shown a baby carrier or stroller of the general type described in the foregoing, but which is convertible into a backpack for transporting without the child. Conversion is achieved by folding the frame into a substantially flat configuration which may then be strapped to a person's back. Unfortunately, in its backpack configuration, the carrier cannot be used to carry an infant. In U.S. Pat. No. 4,487,428 of Harada, et al., there is shown a similar baby carrier convertible to a backpack, but incapable of carrying a child in its backpack configuration. On the other hand, in U.S. Pat. No. 4,586,721 of Harada et al., the carrier can be folded into a semi-collapsed configuration for carrying as a backpack, and the child may be carried in the carrier thus folded. Other U.S. patents which disclose baby carriers that are convertible into baby carrying backpacks are U.S. Pat, No. 3,984,115 of Miller and U.S. Pat. No. 4,762,256 of Whitaker.

In U.S. Pat. No. 4,679,804 of Johnson, there is shown a baby carrier which is convertible between stroller and car seat configurations. A carrier portion having a fixed seat shape has foldable legs attached thereto to form a car seat when they are folded.

The foregoing patents disclose baby carriers susceptible of only one or two uses, i.e., a stroller or a backpack. In U.S. Pat. No. 5,157,837 of Kao, there is shown a baby carrier that can be configured as a backpack, a stroller, a bed, a bassinet, or a baby seat by simply altering the position of an extension frame relative to the main frame, which supports the child's seat. Thus, the arrangement of the Kao patent appears to be somewhat more versatile than the priorly discussed patented arrangements, although some of those arrangements conceivably could be used for other functions in a manner similar to the Kao arrangement.

None of the foregoing patented arrangements appears to afford much protection for the child being carried. All of the arrangements are of open tubular framework construction wherein the seat for the child in a typical cloth bucket having leg holes. Such an arrangement offers little protection for the child especially where the child is not strapped into the carrier. In U.S. Pat. No. 4,681,844 of Mar et al., there is shown a baby carrier which can be adapted to a variety of uses, such as, for example, a stroller, a backpack, a car seat, or a bed, and which affords more protection for the child than other prior art devices. The baby seat is a molded plastic member having sidewalls in which the child is strapped by means of a safety belt having shoulder straps and a horizontal waist belt. Additional protection is provided by a U-shaped horizontal bar which is situated in front of the child, and which is covered by a sponge protection sleeve. With such an arrangement, the child is protected to some extent from possible impacts from the sides, from the rear, or from below, while remaining safely contained within the seat. The various configurations for the different uses are achieved through manipulation of a number of telescoping and/or folding frame members which together form a support frame for the seat member, which is permanently attached to the frame. Thus, when the carrier is used as a backpack or when it is carried in the parent's arms, the entire frame structure although folded up, must also be carried by the parent. Additionally, regardless of the configuration of the assembly, the configuration of the molded seat portion does not change. As a consequence, when used as a bed, for example, the child does not lie flat upon the bed, either his torso or his legs must be elevated, with a consequent degree of discomfort.

SUMMARY OF THE INVENTION

The present invention is a convertible baby carrier which is configurable to a wide variety of uses, such as, for example, a backpack, a stroller, a car seat, a bed, or simply a chair for a small child. The carrier protects the child from impacts and the like and also maintains the child in the seat by means of safety belts or straps. The different configurations are achieved, for the most part, by arranging legs in a number of different angular orientations. The legs themselves are quickly attachable to and detachable from the seat portion of the carrier which, in turn, is configurable to the particular desired use of the carrier. Thus, unlike the prior art devices, the seat portion itself has a number of different configurations.

In a preferred embodiment of the invention, the carrier comprises an upper body portion and a lower body portion hinged together by means of a lockable hinge arrangement and which together form the seat or bed for the child. The angle between the lower portion and the upper portion is alterable so that an upright seat, a reclining seat, or a flat bed, each of different configuration, can be formed with the two body portions. Both of the body portions are preferably molded of lightweight plastic material and together form a clamshell structure having protective side and end walls thus affording the child a great deal of protection. A padded supporting pad dimensioned to fit within the clamshell is provided to give the child a comfortable surface upon which to sit or lie. The pad is slotted, and matching slots are provided in the clamshell, for threading safety straps therethrough to be fastened over the child's shoulders and between its legs. The upper end of the upper body portion has a retractable and extendable handle therein, and means are provided for locking the handle in any desired position within its extendable range.

The upper half of the sidewalls of the upper body portion are grooved or recessed to contain a padded safety bar which is pivoted to the side walls so that it can be swung down in front of the child for additional protection and safety. The side arms of the handle which are adapted to rest within the grooves are of a length sufficient to ensure that the padded handle clears the child's head when it is being pivoted down to its safety position or up to its stored position.

The lower body portion is made in two sections, a rear section which is hinged to the upper body portion, and a front section which is attachable to and removable from the rear portion. The distal or outer end of the front section has a guard wall extending between the two side walls to afford more protection for the child, and especially the child's lower extremities. On the exterior of the side walls of the rear portion are first and second angularly disposed detent slots which are adapted to mate with corresponding detent protuberances or plungers on a pair of elongated legs, which are joined together at their distal ends. Each leg is pivoted to the side wall at a point between the detent slots, and lockable means are provided at the pivot point. The detent slots define two angular orientations of the legs relative to the lower body portion. When the plungers are in their corresponding slots and the lockable means is locked, the legs are firmly fixed in their desired angular orientation relative to the lower body portion. The plungers may take the form of spring loaded D-shaped members configured to fit within the slots. The spring functions to force the member into the detent slot and hold it there, thus prohibiting angular movement of the leg in the event of a heavy load or impact thereon.

The lower portion of the upper body portion terminates in a rounded lobe which mates with a similar lobe on the lower body portion. The rounded lobes make it possible, in some configurations, to rock the assembly, thereby making the carrier into a rocking seat or bed.

At the bottom or lower part of each sidewall of the upper body portion is a wedge shaped slot preferably formed within the wall for receiving one of the two rear legs of the carrier. Each leg is pivoted at the apex of the slot and can be moved to one or two or more positions within the slot where it is fixed by means locking the pivot and by pins through the body portion and the leg. The rear legs are joined together and a stabilizing bar extends from the rear to the front legs.

With such a construction, the carrier can be configured for any of a number of uses, as pointed out hereinafter, with both the seat portion and the carrier portion being adjustable to the desired configuration. The carrier of the invention is a lightweight sturdy shock resistant construction that enables the child to be comfortable while affording it a large measure of protection from impacts or shocks.

The various features and advantages of the present invention will be more readily apparent from the following detailed description, read in conjunction with the accompanying drawings.

DETAILED DESCRIPTION OF THE DRAWINGS

Figure 1:
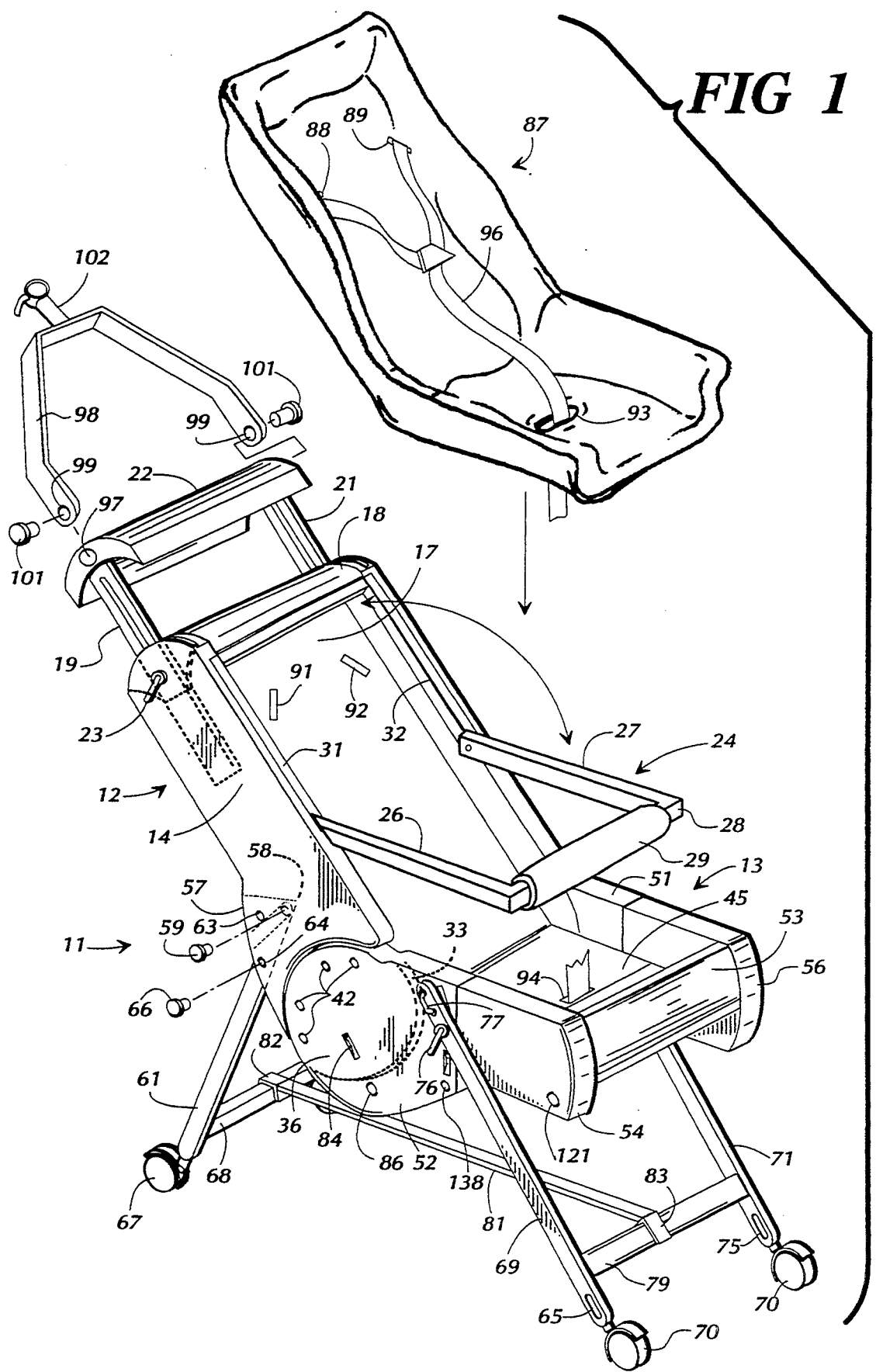
FIG. 1 is a perspective view of the preferred embodiment of the invention configured as a stroller.
Figure 2:
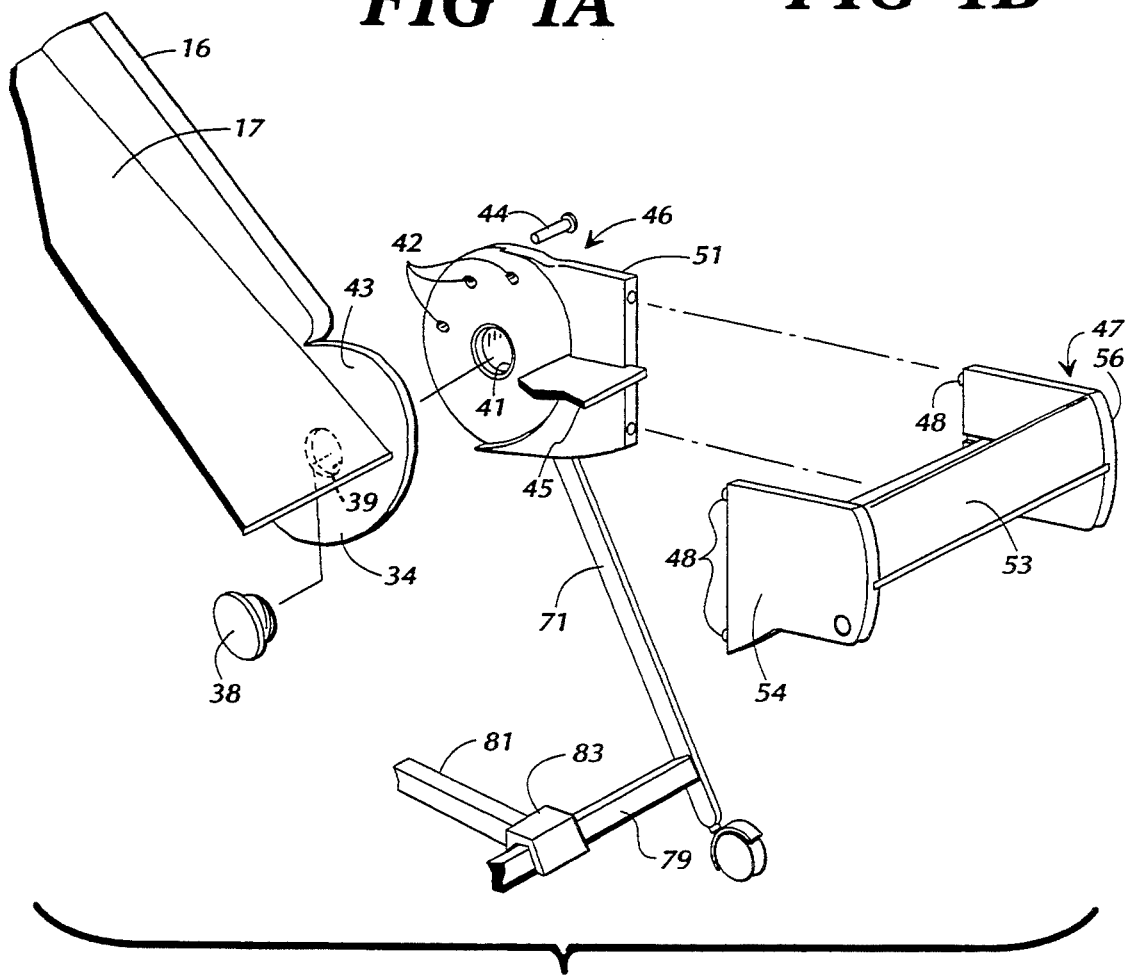
FIG. 2 is an exploded perspective view of a detail of the carrier of FIG. 1.

In FIG. 1, there is shown the baby carriage 11 of the present invention in its stroller configuration. The carrier 11 comprises an upper body portion 12 and a lower body portion 13 which are hinged together by a lockable hinge arrangement, as shown in FIG. 2. Upper body portion 12 comprises a molded member of lightweight plastic material, such as, for example, expanded polystyrene, having side walls 14 and 16 and a substantially flat supporting surface 17 which may be, for example, a flat sheet of hard plastic material supported within grooves, not shown, in side walls 14 and 16. The upper end of upper body portion 12 has a protective wall 18 extending between side walls 14 and 16, and side walls 14 and 16 have slots (shown in dash lines) in their upper ends to receive slotted extension arms 19 and 21 which support a handle 22. Handle 22, as shown in FIG. 1, can be given a slightly concave shape to match the convex curvation of the ends of end walls 14 and 16 and wall 18. Slotted extension arms 19 and 21, which are preferably made of a hard, wear resistant plastic, can be slipped in or out as desired, and locked in place by one or a pair of locking devices 23 only one of which is shown, such as a commercially available cam lock. When extension arms 19 and 21 are fully extended, they can be pivoted about locking devices 23 to vary their angular relationship to body portion 12. A U-shaped safety bar 24 comprises first and second legs 26 and 27, each of which is pivotally attached to its corresponding side wall, and a cross piece 28 having a padded cover 29 thereon. Safety bar 24 is preferably made of hollow plastic, such as polyvinyl chloride, square tubing, and padded cover 29, may be made, for example, of foam rubber. In addition, legs 26 and 27 may be made adjustable in length, if desired. The bar 24 has an operative position, as shown in FIG. 1, and can be pivoted to a stored position as indicated by the arrow. To this end, side walls 14 and 16 have formed along their top edges storage slots or recesses 31 and 32 respectively for receiving legs 26 and 27 when they are pivoted to the storage position.

Figure 2A:
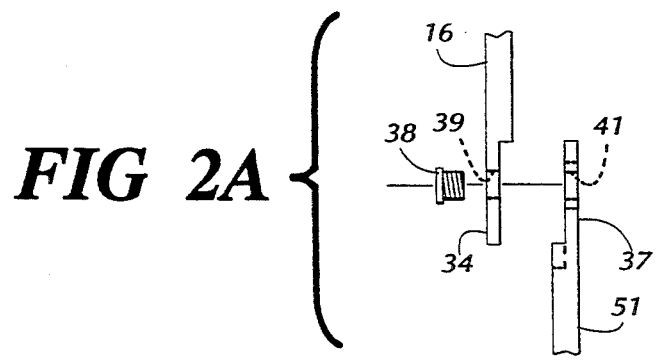
FIG. 2A is a view of a detail of the arrangement of FIG. 2.

The lower ends of the sidewalls of upper body portion terminate in large circular portions or lobes 33 and 34, which, as shown in FIGS. 2 and 2A are made approximately one-half of the width of the wall portions 14 and 16 and are adapted to mate with circular end portions or lobes 36 and 37 at the rear of the lower body portion 13. Portions 33 and 36, and 34 and 37, when mated and held together by threaded plugs 38, 38, only one of which is shown, form a lockable hinge or pivot joint that permits altering the angular relationship of the upper body portion 12 relative to the lower body portion 13, and locking them in the chosen position by tightening plug 38. Threaded plug 38, which may be of a hard plastic material such as polyvinyl chloride, or of a lightweight metallic material, passes through a hole 39 in circular portion 34, and into a threaded bore 41 in circular portion 37. Threaded bore 41 is preferably a threaded insert of the same hard, durable material, as plug 38. Additional locking as well as protection against the slipping or loosening of plug 38 in threaded bore 41 is achieved by a plurality of holes 42, 42 in circular portions 36 and 37, and a single hole 43 in circular portions or lobes 34 and 36. When the desired angular relationship between body portions 12 and 13 is achieved, one of the holes 42 will coincide with the hole 43, and a headed dowel or pin 44 is insertable therein to prevent slippage between the body portions 12 and 13. Alternatively, pins 44 may be spring loaded and permanently mounted. Obviously, the more holes 42 that there are, the more locked angular positions that can be realized. While in FIG. 2A body portion or lobe 37 overlaps body portion 34, the opposite configuration is also possible.

The insert 41, as well as other hard inserts to be discussed hereinafter, are not necessary where the material of the body portions 12 and 13 is sufficiently hard to resist wear and breakage.

As best seen in FIG. 2, lower body portion 13 comprises a rear portion 46 and a front portion 47 which define a two piece support surface 45, and the proximal end of front portion 47 can be attached to rear portion 46 by means of dowels 48, 48 which are insertable into holes 49, 49 in the side walls 51 and 52 (not shown in FIG. 2). Dowels 48, 48 may be circular or square in cross-section and are a tight fit in holes 49, 49 of similar cross-section. To prevent undue wear, holes 49, 49 may be hard plastic bushings, inserted into bores in portions 51 an 52, and dowels 48, 48 may also be hard plastic pins inserted into front portion 47. That portion of support surface 45 in rear portion 46 is supported therein by grooves, not shown, so that it can be removed by sliding it out after front portion 47 has been removed. The distal end of front portion 47 terminates in a protective wall 53 which extends between the side walls 54 and 56 of the front portion 47 and functions to protect the child's feet and legs. It can be seen in FIG. 2 that the support surface 45 is located intermediate the top and bottom edges of the side walls 51, 52 and 54, 56, thereby leaving a space below the support surface bounded by the side walls.

Figure 3:
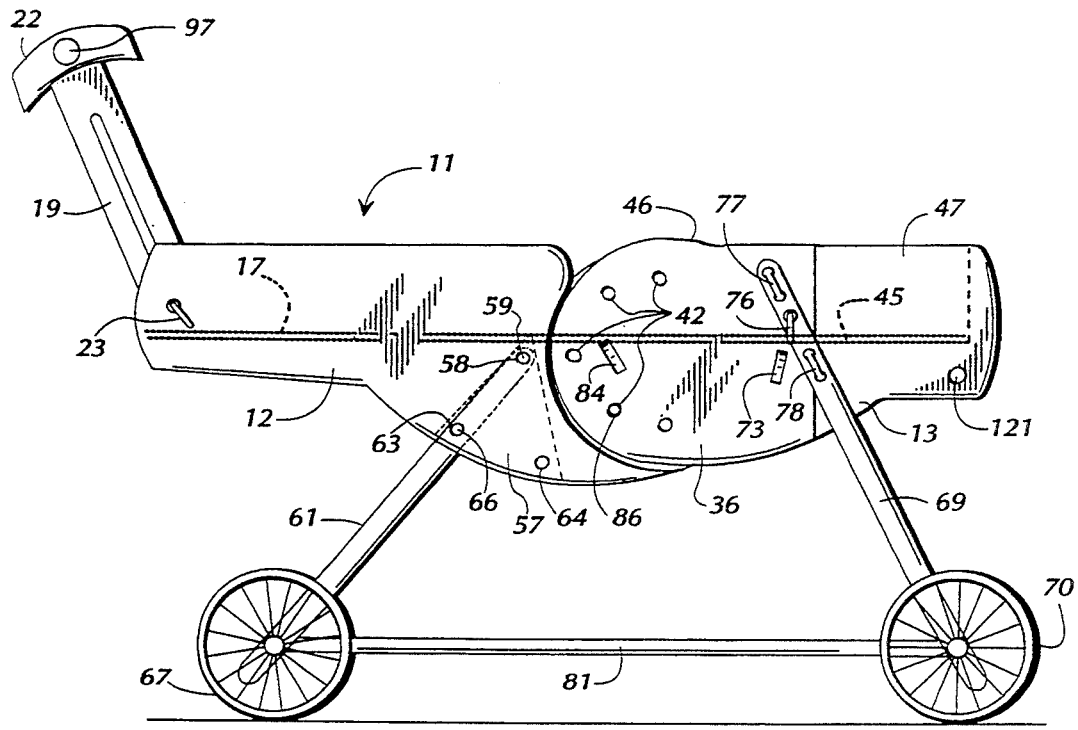
FIG. 3 is an elevation view of the carrier of the invention configured as a perambulator or stroller in which the child reclines.
Figure 4:
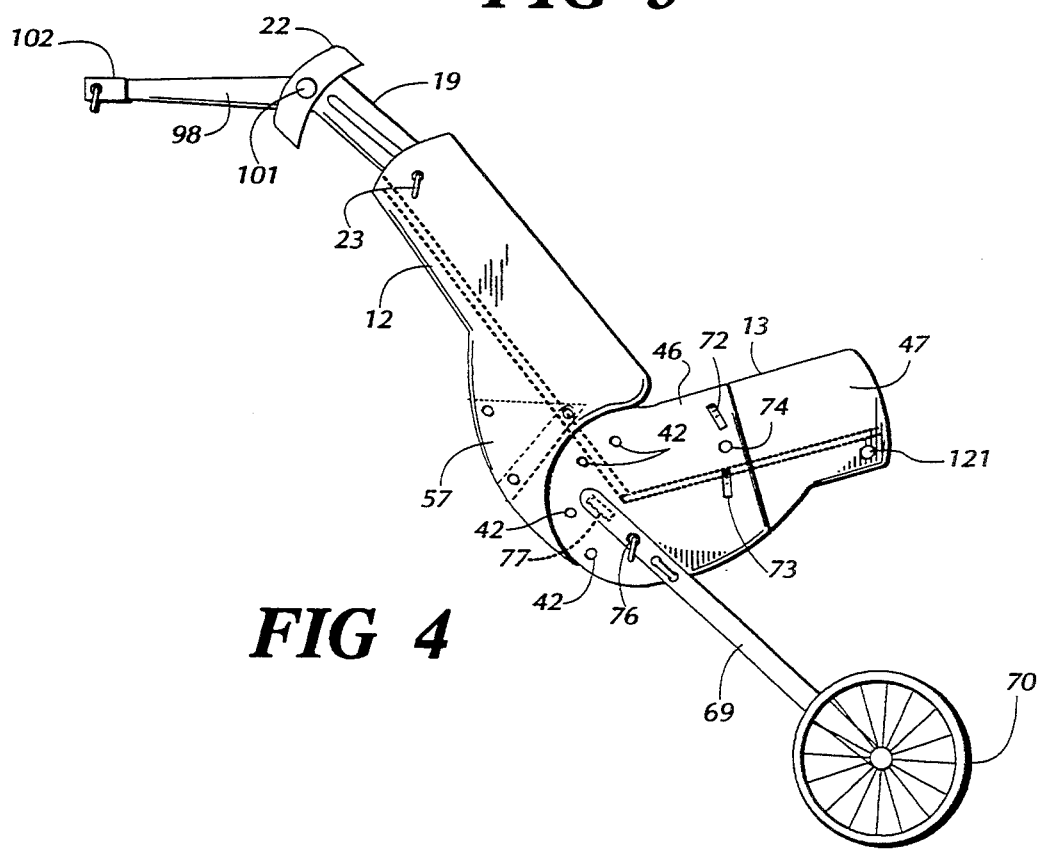
FIG. 4 is an elevational view of the carrier of the invention configured to be towed behind a bicycle.

As best seen in FIG. 1, side walls 14 and 16 each have a wedge shaped slot 57 at the apex of which is a pivot point which may be defined by a hard plastic or metallic, or even wood, bushing 58 into which a headed pin 59 of similar material is inserted. Pin 59 may be in the form of a cam lock, if desired, for added stability and safety. First and second rear legs 61 and 62 (not shown) have their proximal ends insertable into a slot 57 and each is held in place, but free to pivot, by pin 59 passing through a hole in the proximal end thereof. First and second holes 63 and 64 with bushings, if necessary, in cooperation with a headed pin or plug 66, serve to fix legs 61 and 62 in either of two positions, depending upon the carrier configuration. While only two such holes 63 and 64 are shown, additional holes and hence additional leg positions may be provided for, if desired. The distal ends of legs 61 and 62 terminate in suitable wheels 67, 67, which as shown in FIG. 1, may take the form of standard, commercially available casters, or which may be somewhat larger wheels, as shown in FIGS. 3 and 4. A crosspiece 68 extending between legs 61 and 62 maintains them in fixed spaced relationship. Each one of legs 61 and 62 may also be made in telescoping parts to ensure that they are of the proper length for the particular carrier configuration. The casters and large wheels may be configured to be interchangeable and to be easily removed where not required, as in the bed or backpack configuration of the carrier.

Figure 1A:
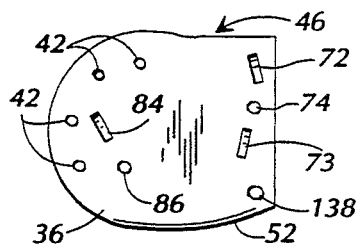
FIG. 1A is an elevation view of a detail of the carrier of FIG. 1.
Figure 1B:
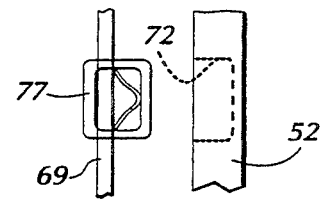
FIG. 1B is a view of a detail of the carrier of FIG. 1.

First and second front legs 69 and 71 having removable casters 70 or wheels at their distal ends, are each attached to the rear section 46 of lower body portion 13. As seen in FIGS. 1A and 1B, member 52 (and member 51, not shown) has first and second detent slots 72 and 73, and a circular bore 74, which preferably is in the form of a hard plastic insert, between the slots for receiving a locking cam lock 76. Each of the legs 69 and 71 has, adjacent the proximal end, a spring loaded D-shaped detent boss or plunger 77, dimensioned to fit within either one of the slots 72 and 73, and a bore adjacent boss or plunger 77 for receiving the locking member 76, which passes therethrough. Locking member 76 may take any of a number of forms, such as a cam lock or a threaded wing-bolt, in which case, bore 74 would be threaded, or other suitable locking devices. Detent boss or plunger 77 is preferably spring loaded by a leaf spring 79 which tends to force the boss or plunger 77, for example, into slot 72. When legs 69 and 71 are in the position shown in FIG. 1, boss 77 is engaged in slot 72 and locked by member 76. Legs 69 and 71 are maintained in spaced relation by a spacer bar 79, and preferably are fixed relative to rear legs 61 and 62 by a stabilizer bar 81 having U-shaped ends 82 and 83 which hook over bars 68 and 79 respectively.

As best seen in FIG 1A, portion 36 has a third detent slot 84 and a bore insert 86 which are used in a different configuration of the carrier, as will be apparent hereinafter. Also, the distal ends of legs 69 and 71 have slots 65 and 75 therein for use in a particular carrier configuration to be discussed hereinafter.

For the child's comfort, a padded support member 87 is provided which is adapted to rest upon support surfaces 17 and 45. Member 87 can be made of an outer, preferably waterproof material stuffed with padding material such as granulated foam rubber, for example. First and second slots 88 and 89 extend through member 87 and coincide with matching slots 91 and 92 in support surface 17. In like manner, a slot 93 in member 87 coincides with a matching slot 94 in support surface 45. A seat belt or other restraining strap like device 96 can be passed through the slots, as shown in FIG. 1, to provide safety restraint for the child. The configuration of 96 shown in FIG. 1 is only one example of such a restraint member, and member 87 and surfaces 17 and 45 can be slotted in other ways to accommodate other seat belt configurations.

As thus far described, the carrier of FIG. 1 is usable as a stroller in which the child can sit up, or recline at an angle. In FIG. 3, the carrier 11 is shown as a stroller in which the child seat is flat so that the child is fully reclined. This configuration is achieved by pivoting rear legs 61 and 62 to the rear of wedge shaped slot 57, with pin 59 remaining in hole or bushing 58, and with pin 66 inserted into hole or bushing 63. Handle 22 is pulled out to its maximum extension and angled to suit the person pushing the stroller, then locked in place by locking members 23, 23. The advantages of such convertibility of the carrier 11 are readily apparent. In some cases the child, for whatever reason, cannot sit up, or, in the case of especially small children, being forced to sit, however, comfortably, can be tiring. With the conversion as shown in FIG. 3, the child can readily lie down without the necessity of interrupting the stroll for longer than it takes to make the conversion. In the arrangement of FIG. 3, removal of all of the legs converts the carrier into a simple bed for the child. Alternatively, rear legs 61 and 62 can be removed and front legs 69 and 71 loosened and pivoted to the rear to form a simple bed. After pivoting, legs 69 and 71 can be tightened to act as stablizers, if desired.

In FIG. 4, there is shown the carrier 11 adapted to be towed behind a bicycle, for example. For this configuration, the rear legs 61 and 62 and the stabilizer bar 81 are removed and the front legs 69 and 71 are moved back so that plunger 77 fits within slot 84 and pivot and locking members 76 fits within insert or hole 86. In addition, large wheels 70 are fitted to the distal ends of legs 69 and 71. Handle 22 is provided with a hole 97 at either side thereof, and yoke member 98, which is substantially U-shaped as best seen in FIG. 1, is designed to straddle the ends of handle 22 with holes 99, 99 in the distal ends thereof coinciding with holes 97, 97. Holes 99, 99 are preferably slightly larger in diameter than holes 97, 97 so that headed pins 101, 101 pass easily through holes 99, 99 and are a tight fit in holes 97, 97, thereby enabling yoke 98 to pivot relative to handle 22. If necessary, holes 97, 97 and 99, 99 may have hard plastic inserts to prevent wear. If desired, holes 97 and 99 may be octagonal in shape with the pins 101, 101 having the same shape so that when pins 101, 101 are inserted, yoke member 98 is locked in position. Yoke 98 is provided with an attachment device 102 for attachment to the rear of the bicycle or other suitable vehicle. Device 102 may take any of a number of forms readily available on the open market. With the configuration shown in FIGS. 1 and 4, the child can be towed along behind a bicycle, for example, with yoke 98 being pivotable about pins 101, 101 so that the carrier 11 remains at substantially the same angle of inclination most of the time.

Figure 5:
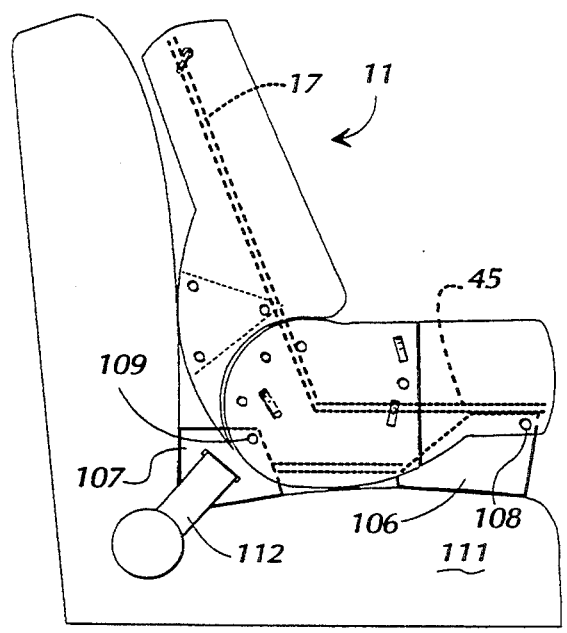
FIG. 5 illustrates the carrier of the invention configured as a car seat.
Figure 6:
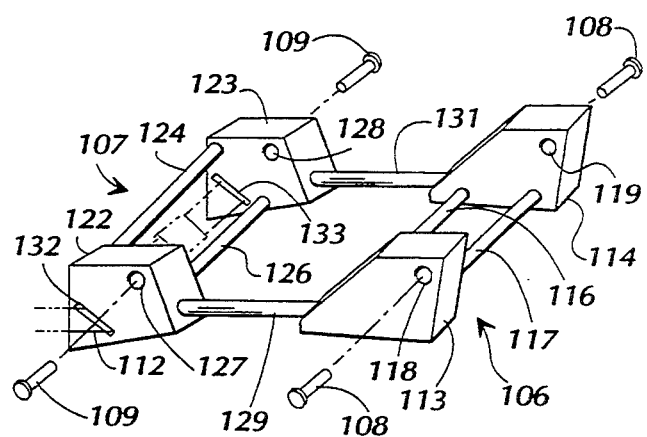
FIG. 6 is a perspective view of a preferred support means for the arrangement of FIG. 5.

In FIG. 5 there is shown an arrangement for utilizing the carrier 11 as a car seat, and in FIG. 6 is shown the support device for the arrangement of FIG. 5. In FIG. 5, the carrier 11 rests upon front and rear support members 106 and 107 respectively, and is affixed thereto with headed pins 108, 108 and 109, 109. The support members 106 and 107 are preferably of a hard plastic material and are held in place on automobile seat 111 by the standard automobile safety belt 112. The support assembly, to be discussed in connection with FIG. 6, is designed to fit within the space defined by the sidewalls below the support surfaces 17 and 45, as shown in dashed lines, and to bear against the interior surfaces of the sidewalls 14 and 16 and 54 and 56. In addition, the lower surface of support surface 45 may rest upon support member 106, as shown.

In FIG. 6 it can be seen that support members 106 and 107 form a cradle upon which carrier 11 rests and is affixed. Front support member 106 comprises first and second spaced blocks 113 and 114 respectively which are maintained in spaced relationship by a suitable device, such as rods 116 and 117. Blocks 113 and 114 each have a hole 118 and 119 bored therein designed to receive headed locking pins 108, 108. Locking pins 108, 108 may be permanently mounted in holes 121, 121 in side walls 64 and 56, shown in FIG. 1. Holes 118 and 119 are positioned to coincide with matching holes 121, 121 in side walls 54 and 56 (see FIG. 1) so that when carrier 11 is positioned on support 106 pins 108, 108 pass through holes 121, 121 into holes 188 and 119. By this arrangement, the lower portion of carrier 11 is firmly affixed to support 106.

Support member 107 comprises first and second spaced blocks 122 and 123, respectively, maintained in spaced relationship by a suitable device such as spacer bars 124 and 126. Block 122 has a hole 127 bored therein for receiving a headed locking pin 109. Hole 127 is positioned to coincide with one of the holes 42 in portion 46 so that pin 109 passes therethrough. If necessary, instead of hole 42, a separate hole in member 46 may be drilled, in which case pins 109, 109 may be permanently mounted in the holes in portion 46 and spring loaded, if desired. In like manner, block 123 has a hole 128 bored therein for receiving headed locking pin 109. With pins 109, 109 firmly in place, carrier 11 is affixed to both front support 106 and rear support 107.

Supports 106 and 107 are maintained in spaced relationship by suitable spacer bars 129 and 131. Preferably, blocks 113, 114 are slidable on bars 129 and 131, and can be locked in position by a suitable locking device 120. Stops 130 and 135 on bars 129, 131 respectively, limit the rearward movement of blocks 113, 114, thereby defining a minimum spacing between blocks 113, 114 and 122, 123. Block 122 has a slot 132 extending therethrough and block 123 has a similar slot 133 extending therethrough. Slots 132 and 133 are sized to allow automobile seat belt 112 with its buckles, to pass therethrough and buckled in the space between blocks 122 and 123, as shown in dashed lines. In this manner, the entire support assembly is affixed to the automobile seat. After seat belt 112 has been tightened and buckled, carrier 11 is then placed on the cradle thus positioned and affixed thereto. It can be seen in FIG. 6 that the support arrangement inhibits any backward and forward rocking of the carrier and the seat belt, when tightly drawn and buckled, inhibits any sideways or forward movement.

It is to be understood that the arrangement for affixing the carrier to an automobile seat is intended as an illustrative embodiment of one device for thus supporting the carrier, and numerous other arrangements are possible. For example, instead of headed pins 108, 108 and 109, 109, spring loaded plungers can be mounted in the carrier 11 at the locations of holes 121, 121 and one of the holes 42, 42.

Figure 7:
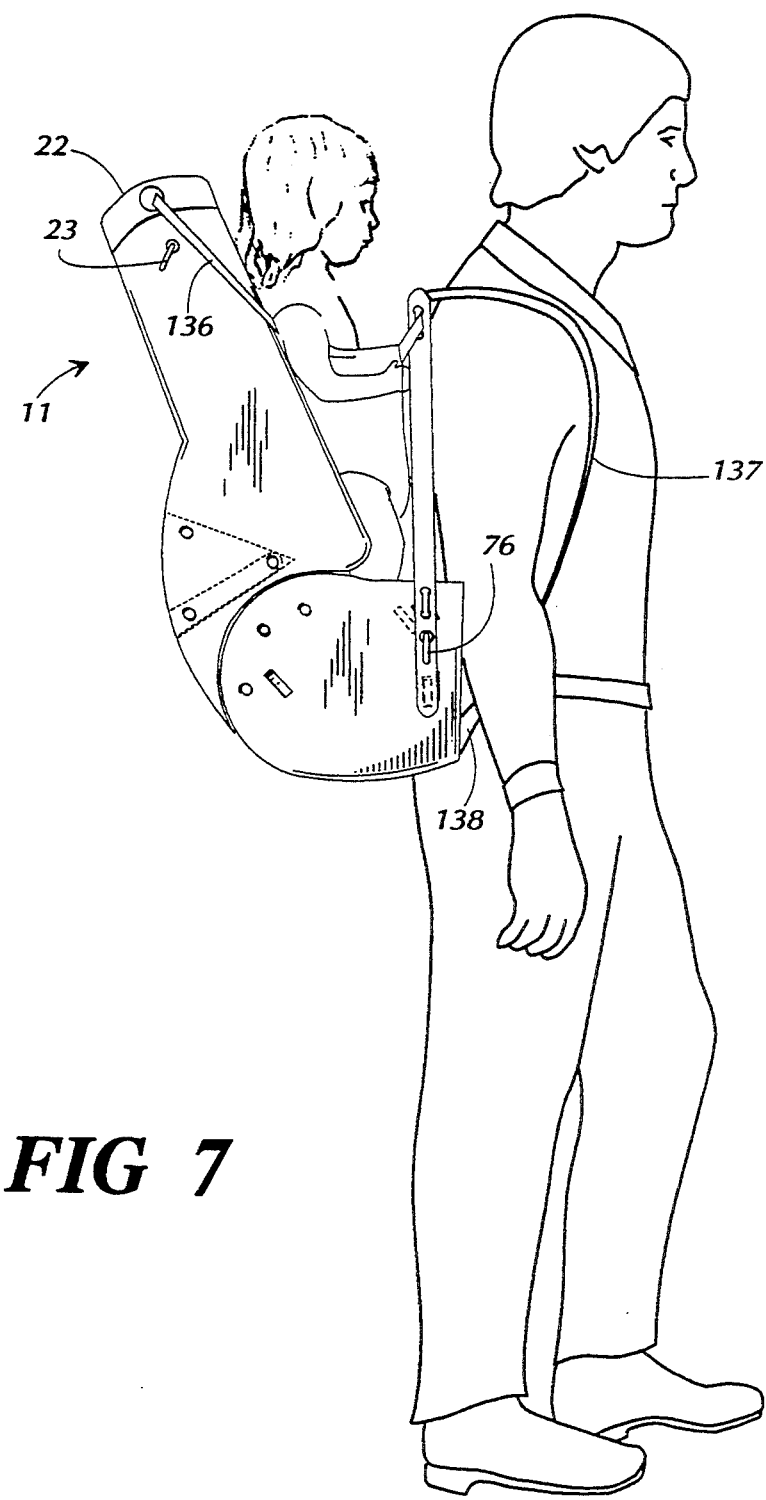
FIG. 7 is an elevation view of the carrier of the invention configured as a back pack.

In FIG. 7 there is shown the carrier 11 configured as a back pack. For this configuration, the front portion 47 of the lower portion 13 is removed, as are the rear legs 61 and 62. In addition, support surface 45 is removed by being slid out of the support grooves. The wheels 70 are removed from legs 69 and 71 and these legs are then swung up to a position where plunger 77 fits into detent slot 73 and is then locked in place by locking member 76. The child is positioned within the carrier and held by safety belt or strap 96. Alternatively, slots 134, 134 may be formed in the upper end of upper portion 12 to receive an auxiliary strap 136 for providing protection for the child. Auxiliary strap 136 may be fastened to the holes 97 in the handle 22 by pins 101, 101. Shoulder straps 137, 137 are passed through slots 65 and 75 at the distal ends of legs 69 and 71 respectively, over the parent's or other person's shoulders, and are affixed to the carrier 11 at points 138, 138 in member 46. The manner of affixing the straps 137, 137 to points 138, 138 may take any of a number of forms such as pins inserted through the ends of the straps into holes formed at points 138, 138, or by a form of clip a, if desired.

From the foregoing, it can be seen that the carrier of the invention can be configured for a large number of uses while at all times protecting the child to a degree not shown in the aforementioned prior art. Numerous modifications or alterations to the illustrated preferred embodiment may occur to workers in the art without departure from the spirit and scope of the invention.

I claim:

1. A carrier for a small child, comprising:
   a first body portion having first and second ends, first and second spaced walls, and a support surface extending between said first and second spaced walls;
   a second body portion having third and fourth ends, third and fourth spaced walls, and a support surface extending between said third and fourth spaced walls;
   means for pivotally joining and holding the second end of said first body portion to the third end of said second body portion;
   affixing means in said first body portion for affixing first and second support legs, each leg having a proximal end and a distal end, to said first body portion, said affixing means including means for pivotally mounting the proximal ends of the first and second support legs to said first body portion;
   a first means for fixing the angular position of the first and second legs relative to said first body portion;
   mounting means for mounting third and fourth support legs, each of said third and fourth legs having a proximal end and a distal end, to said second body portion, said mounting means including means for pivotally mounting the proximal ends of the third and fourth legs to said second body portion;
   a second means for fixing the angular position of the third and fourth legs relative to said second body portion; and
   restraining means for holding the child within the carrier;
   wherein each of said first and second spaced walls of said first body portion has a lobe at said second end of said first body portion and each of said third and fourth spaced walls of said second body portion has a lobe at said third end of said second body portion for mating with the corresponding lobes of said first body portion, and said means for pivotally joining and holding said first and second body portions comprises threaded means passing through one of said mating lobes and threaded into a threaded bore in the other of said mating lobes.

2. A carrier for a small child as claimed in claim 1 and further comprising means for locking said first body portion and said second body portion in a fixed angular relationship to each other.

3. A carrier for a small child as claimed in claim 1 wherein said first end of said first body portion has a protective wall extending between said first and second spaced walls.

4. A carrier for a small child as claimed in claim 1 wherein said fourth end of said second body portion has a protective wall extending between said third and fourth spaced walls.

5. A carrier for a small child as claimed in claim 1 and further comprising locking means for locking said first body portion and said second body portion in a fixed angular relationship to each other, said locking means comprising
   at least one aperture in each of said mating-lobes, and means for passing through the apertures in said mating lobes when said apertures are in alignment.

6. A carrier for a small child as claimed in claim 1 wherein said first and second body portions are made of a plastic material.

7. A carrier for a small child as claimed in claim 1 wherein said first and second body portions are made of expanded polystyrene.

8. A carrier for a small child as claimed in claim 7 wherein said threaded bore comprises an insert of a hard plastic material in said other of said mating lobes, and said threaded means comprises a threaded plug made of a hard plastic material.

9. A carrier for a small child as claimed in claim 1 wherein said second body portion comprises a rear portion and a separate front portion having a distal end and a proximal end and including means for attaching the proximal end of said front portion to said rear portion.

10. A carrier for a small child as claimed in claim 9 wherein said distal end of said front portion comprises said third end of said second body portion.

11. A carrier for a small child, comprising:
    a first body portion comprising first and second ends and first and second spaced side walls having upper and lower edges;
    a support member extending between said first and second side walls intermediate said upper and lower edges of said first body portion;
    a second body portion comprising third and fourth ends and third and fourth spaced side walls having upper and lower edges;
    a support member extending between said third and fourth side walls intermediate said upper and lower edges of said second body portion;
    means for pivotally joining the second end of said first body portion to the third end of said second body portion with the ends of said second and third side walls of said first and second body portions overlapping;
    first and second spaced support legs, each of said first and second support legs having a distal end and a proximal end;
    first and second pivot means for pivotally mounting each of said first and second support legs respectively to said first and second side walls of said first body portion;
    third and fourth spaced support legs, each of said third and fourth support legs having a distal end and a proximal end;
    third and fourth pivot means for pivotally mounting each of said third and fourth support legs respectively to said third and fourth side walls of said second body portion;
    rotatable means mounted on said distal ends of each of said first, second, third and fourth support legs; and
    restraining means for holding the child within the carrier;
    said carrier further comprising positioning means for fixing the angular position of said first and second legs relative to said first body portion, wherein said positioning means comprises at least one bore in each of said first and second side walls of said first body portion, a bore in each of said first and second legs, and means insertable into said bores in each of said first and second side walls and in said first and second legs when said bores are aligned.

12. A carrier for a small child as claimed in claim 11 and further comprising;

positioning means for fixing the angular position of said third and fourth legs relative to said second body portion.

13. A carrier for a small child as claimed in claim 11 and further comprising a handle assembly mounted to said first body portion at said first end thereof.

14. A carrier for a small child, comprising:

a first body portion comprising first and second ends and first and second spaced side walls having upper and lower edges;

a support member extending between said first and second side walls intermediate said upper and lower edges of said first body portion;

a second body portion comprising third and fourth ends and third and fourth spaced side walls having upper and lower edges;

a support member extending between said third and fourth side walls intermediate said upper and lower edges of said second body portion;

means for pivotally joining the second end of said first body portion to the third end of said second body portion with the ends of said second and third side walls of said first and second body portions overlapping;

first and second spaced support legs, each of said first and second support legs having a distal end and a proximal end;

first and second pivot means for pivotally mounting each of said first and second support legs respectively to said first and second side walls of said first body portion;

third and fourth spaced support legs, each of said third and fourth support legs having a distal end and a proximal end;

third and fourth pivot means for pivotally mounting each of said third and fourth support legs respectively to said third and fourth side walls of said second body portion;

rotatable means mounted on said distal ends of each of said first, second, third and fourth support legs; and restraining means for holding the child within the carrier;

said carrier further comprising positioning means for fixing the angular position of said third and fourth legs relative to said second body portion;

wherein said positioning means comprises at least one detent recess in each of said third and fourth side walls of said second body portion, and plunger means on each of said third and fourth legs for fitting within the corresponding detent recess.

15. A carrier for a small child as claimed in claim 14 and further including biasing means for holding each of said plunger means in its corresponding detent recess.

16. A carrier for a small child as claimed in claim 15 wherein said plunger means is a D-shaped member and said biasing means is a spring member.

17. A carrier for a small child, comprising:

a first body portion comprising first and second ends and first and second spaced side walls having upper and lower edges;

a support member extending between said first and second side walls intermediate said upper and lower edges of said first body portion;

a second body portion comprising third and fourth ends and third and fourth spaced side walls having upper and lower edges;

a support member extending between said third and fourth side walls intermediate said upper and lower edges of said second body portion;

means for pivotally joining the second end of said first body portion to the third end of said second body portion with the ends of said second and third side walls of said first and second body portions overlapping;

first and second spaced support legs, each of said first and second support legs having a distal end and a proximal end;

first and second pivot means for pivotally mounting each of said first and second support legs respectively to said first and second side walls of said first body portion;

third and fourth spaced support legs, each of said third and fourth support legs having a distal end and a proximal end;

third and fourth pivot means for pivotally mounting each of said third and fourth support legs respectively to said third and fourth side walls of said second body portion;

rotatable means mounted on said distal ends of each of said first, second, third and fourth support legs; and restraining means for holding the child within the carrier;

said carrier further comprising a handle assembly mounted to said first body portion at said first end thereon;

wherein said handle assembly comprises a first slotted arm inserted in said first side wall at the end thereof and slidable with respect thereto, a second slotted arm inserted in said second side wall at the end thereof and slidable with respect thereto, and a handle member extending between said first and second slotted arms.

18. A carrier for a small child as claimed in claim 17, and further including means for locking said handle member in place.

19. A carrier for a small child as claimed in claim 17 and further comprising a yoke member pivotably attached to said handle assembly.

20. A carrier for a small child as claimed in claim 19 wherein said yoke member has a substantially U-shape having first and second arms having distal ends, and means for pivotably mounting the distal ends of said first and second arms to said handle member.

21. A carrier for a small child as claimed in claim 19 and further comprising means for attaching said yoke member to a vehicle.

22. A carrier for a small child, comprising:

a first body portion comprising first and second ends and first and second spaced side walls having upper and lower edges;

a support member extending between said first and second side walls intermediate said upper and lower edges and defining a lower space between said first and second side walls;

a second body portion comprising third and fourth ends and third and fourth spaced side walls having upper and lower edges;

a support member extending between said third and fourth side walls intermediate said upper and lower edges and defining a lower space between said third and fourth side walls;

means for pivotally joining the second end of said first body portion to the third end of said second body portion in overlapping relationship;

means for fixing the angular relationship between said first and second body portions; and a handle assembly mounted to said first body portion at said first end thereof;

wherein said handle assembly comprises a first slotted arm inserted in said first side wall at the end thereof and slidable with respect thereto, a second slotted arm inserted in said second side wall at the end thereof and slidable with respect thereto, and a handle member extending between said first and second slotted arms and wherein said first and second slotted arms are pivotally mounted to said first and second walls, respectively.

23. A carrier for a small child as claimed in claim 22 further comprising means for mounting the carrier on a vehicle seat wherein said means for mounting comprises front and rear spaced support members; and further including means for affixing the carrier to said front and rear support members.

24. A carrier as claimed in claim 23 wherein said rear support member has at least one slot therein for receiving a vehicle restraining means.

25. A carrier as claimed in claim 23 wherein each of said front and rear support members has a width less than a spacing between said first and second side walls and said third and fourth side walls whereby said means for mounting fits within the lower spaces between said first and second side walls and said third and fourth side walls.

26. A carrier as claimed in claim 23 and further including means for varying a spacing between said front and rear support members.

27. A carrier as claimed in claim 23 wherein each of said front and rear support members is mounted on at least one spacer bar extending therebetween.

28. A carrier as claimed in claim 27 wherein said front support member is slidably mounted on said spacer bar.

29. A carrier as claimed in claim 27 wherein said rear support member comprises first and second spaced blocks and means in each of said first and second spaced blocks for receiving a vehicle restraining means.

* * * * *